Jan. 11, 1966  E. F. KUBLER  3,229,182
ARMATURE VOLTAGE SENSING AND INDICATING CIRCUIT
Filed March 7, 1962  2 Sheets-Sheet 1
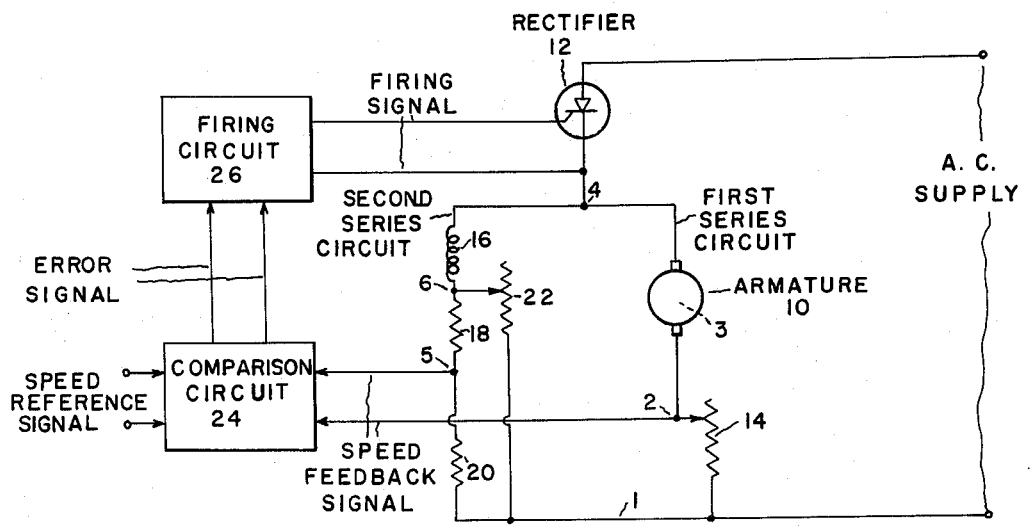
FIGURE 1
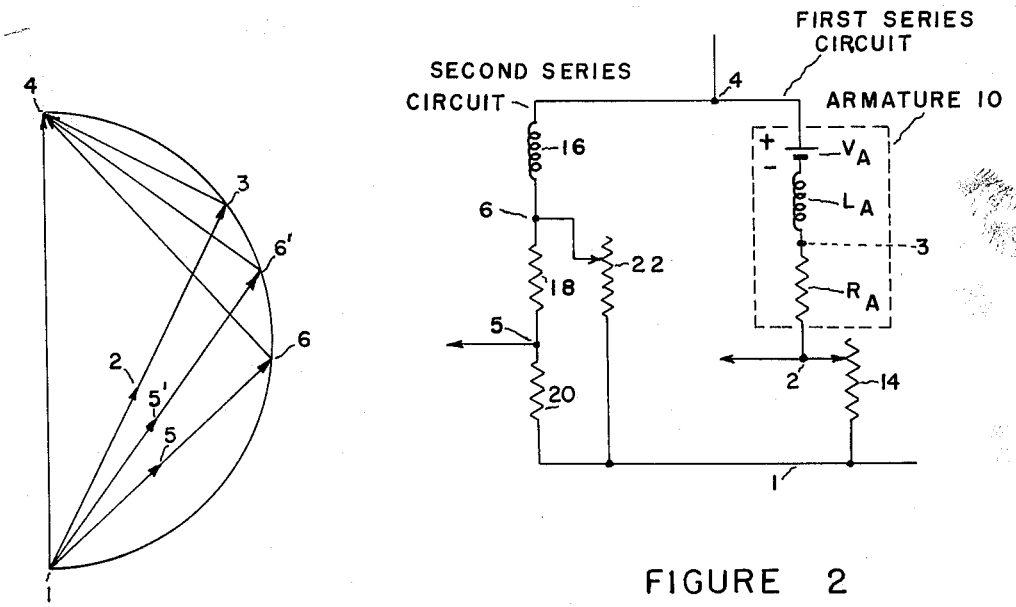
FIGURE 3
FIGURE 2
ERNEST F. KUBLER
BY James G. Williams
ATTORNEY Jan. 11, 1966  E. F. KUBLER  3,229,182
ARMATURE VOLTAGE SENSING AND INDICATING CIRCUIT
Filed March 7, 1962  2 Sheets-Sheet 2

ERNEST F. KUBLER
BY James G. Williams
ATTORNEY

United States Patent Office 3,229,182
Patented Jan. 11, 1966

3,229,182
ARMATURE VOLTAGE SENSING AND
INDICATING CIRCUIT
Ernest F. Kubler, Waynesboro, Va., assignor to General
Electric Company, a corporation of New York
Filed Mar. 7, 1962, Ser. No. 178,104
1 Claim. (Cl. 318—331)

The invention relates to an indicating circuit, and particularly to an indicating circuit for producing a signal indicative of the voltage produced by the armature of a direct current machine.

Present control circuits for controlling the rotational speed of a direct current motor armature may utilize a signal indicative of the actual motor armature speed and a reference signal indicative of the desired motor armature speed. These two signals are compared and an error signal indicative of their relative magnitudes is produced. This error signal is utilized to control the energization of the motor armature so that the motor armature has the desired rotational speed. One known circuit for controlling the energization utilizes a controlled rectifier which is supplied with alternating current. The rectifier permits rectified alternating current or unidirectional current to flow at a point in the alternating current cycle determined by the error signal. A relatively large error signal may permit such a current to begin to flow early in the cycle and thus provide a relatively large energization for the motor armature, while a relatively small error signal may permit such a current to begin to flow only late in the cycle and thus provide a relatively small energization for the motor armature. Generally however, the motor armature is supplied with rectified alternating current in the form of pulses which are not filtered. As is known in the art, the motor armature produces a voltage as a result of rotating through a magnetic field, this voltage having a magnitude indicative of or proportional to the speed of rotation of the armature. This voltage is sometimes referred to as the counter-electromotive force of the armature, and can be utilized in the control circuit as the signal indicative of the actual motor armature speed. However, this voltage has the same pulse form, sometimes referred to as ripple, as the rectified alternating current supplied to the armature. Such a pulse form or ripple may be undesirable, particularly where it has a large magnitude or where it is supplied to an error comparison circuit which has devices such as transistors having operating ranges which are limited or which are less than the magnitude of the pulse form or ripple of the signal.

Therefore, an object of the invention is to provide an improved circuit for indicating the voltage produced by an armature.

Another object of the invention is to provide an indicating circuit that reduces the pulse form or ripple which may be produced by the armature of a direct current machine.

At present, one expedient for reducing such pulse form or ripple utilizes a resistor-capacitor filter network. While such a network may reduce the pulse form or ripple, it has the disadvantage of introducing a time delay that is proportional to the magnitude of the resistors and capacitors forming the filter network. This time delay results in an undesirable lag between a change in armature rotational speed and a corresponding change in the signal indicative of the armature rotational speed. Thus, the motor control circuit may not respond as rapidly as might be desirable or necessary.

Therefore, another object of the invention is to provide an improved circuit for rapidly indicating changes in the voltage produced by an armature.

Another object of the invention is to provide a circuit that reduces the pulse form or ripple which may be produced by the armature of a direct current machine and that provides a relatively rapid indication of changes in the rotational speed of the armature.

Briefly, these and other objects are attained in accordance with the invention by the provision of a first resistor connected in series with the armature to form a first series circuit. A second series circuit having corresponding resistors and an inductance is coupled in parallel with the first series circuit. This second series circuit is provided with means for varying the relative magnitudes of the voltages across the resistors and the inductive impedance. Means are coupled to corresponding points of both series circuits for deriving an indicating signal. This indicating signal has a magnitude indicative of the rotational speed of the armature. And, by means of proper circuit adjustment, the ripple which may be present in the indicating signal is substantially reduced or eliminated.

The invention will be better understood from the following description given in connection with the accompanying drawing, and its scope will be pointed out in the claim. In the drawing:

FIGURE 1 shows a circuit diagram of one embodiment of the indicating circuit of the invention as used with a control circuit;

FIGURE 2 shows an equivalent circuit diagram of a portion of the circuit of FIGURE 1 for explaining the operation of the circuit of FIGURE 1;

FIGURE 3 shows vector diagrams for explaining the operation of the circuit of FIGURE 1;

Figure 4:
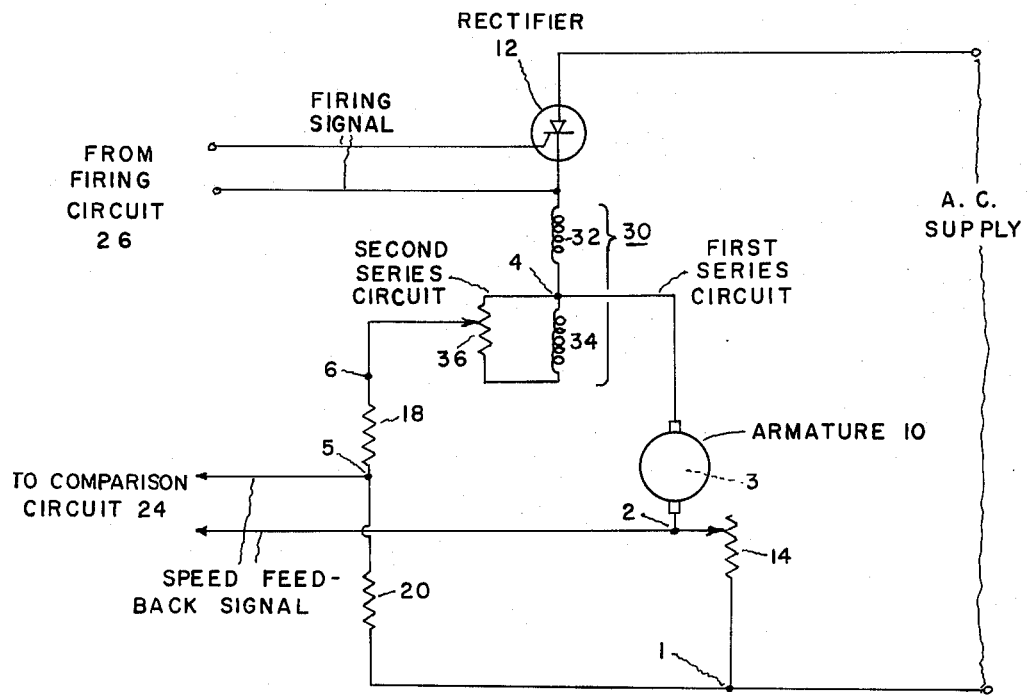
FIGURE 4 shows a circuit diagram of another embodiment of the indicating circuit of the invention.

In FIGURE 1, the reference numerals 1 through 6 indicate junctions for the purpose of describing electrical relationships in the circuit. In FIGURE 1, a direct current motor armature 10 is provided, this armature 10 normally being associated with a shunt field winding which is not shown in FIGURE 1. The motor armature 10 is supplied with suitable direct current which is provided by the rectification of alternating current by a controlled rectifier 12. Such a rectifier 12 is known in the art and includes an anode, a cathode, and a gate or control electrode. A first adjustable resistor 14 is coupled in series with the armature 10 to form a first series circuit between the junctions 1 and 4. The anode-cathode path of the rectifier 12 and the first series circuit are coupled in series across the source of alternating current. A second series circuit is coupled between the junctions 1 and 4, and in parallel with the first series circuit. This second series circuit includes an inductance 16, a second resistor 18, and a third resistor 20. A fourth adjustable resistor 22 is coupled across or in parallel with the second and third resistors 18, 20. A speed feedback signal is derived between the junction 5 (i.e., the junction of the second and third resistors 18, 20), and the junction 2 (i.e., the junction of the motor armature 10 and the first resistor 14). This speed feedback signal is supplied to a comparison circuit 24. A suitable speed reference signal is also supplied to the comparison circuit 24. The comparison circuit 24 is indicated in block diagram form since such a circuit is known in the art, and performs the function of comparing two signals (namely the speed feedback and the speed reference) and producing a suitable error signal indicative of the relative magnitudes of the two compared signals. This error signal is supplied to a suitable firing circuit 26, this firing circuit 26 also being known in the art and performing the function of providing a suitable firing signal for the controlled rectifier 12. In the circuit embodied in FIGURE 1, this firing signal is produced at a particular time relative to the beginning of the positive half-cycles of alternating current. However, a firing signal may not be produced for each such positive half-cycle. In this description, positive half-cycles refer to the portion of the cycles when the anode of the controlled rectifier 12 is positive relative to its cathode. During such positive half-cycles, the controlled rectifier 12 may be rendered conductive (i.e., may be fired) by supplying a suitable firing signal between its gate electrode and its cathode. If the firing signal is supplied early in the positive half-cycle, the controlled rectifier 12 will begin conducting and continue such conduction until the alternating current reverses or changes to the negative half-cycle. In this description, negative half-cycles refer to the portion of the cycles when the anode of the controlled rectifier 12 is negative with respect to its cathode. During such negative half-cycles, the controlled rectifier 12 will not conduct despite application of an appropriate firing signal between its gate electrode and its cathode. If the firing signal is supplied later in the positive half-cycle, the controlled rectifier 12 will begin conducting at such later time and continue such conduction for the remainder of the positive half-cycle. Thus, the length of time during a positive half-cycle that the controlled rectifier 12 conducts may be varied. Such a variable time of conduction provides a variable amount of current or power to the motor armature 10. Thus the armature speed may be varied in accordance with the error signal. Such a control circuit is known in the art, but has been briefly described in order that the invention may be better understood and appreciated.

The invention provides a novel indicating circuit for producing a signal indicative of the motor armature speed. As is known in the art, a motor armature produces a voltage (sometimes called a counter-electromotive force) as a result of the armature rotating through the magnetic field of the motor. This voltage has a magnitude proportion to the speed of rotation of the armature, and may be utilized in a control circuit such as just described. However, since the armature 10 is supplied with pulses of rectified alternating current which are of varying duration (the duration depending upon the amount of power called for by the control circuit), the armature voltage for indicating speed is represented by similar pulses, these pulses sometimes being referred to as ripple. If the comparison circuit 24 contains transistors, such ripple may render the comparison circuit 24 inoperable inasmuch as the ripple magnitude may exceed the operating range of such transistors. The indicating circuit of the invention reduces such ripple as will be explained. First however, the derivation of the speed feedback signal from the junctions 2 and 5 will be explained. This explanation may be better understood by reference to FIGURE 2 which shows an equivalent circuit diagram of the first and second series circuits of FIGURE 1. Portions of the equivalent circuit of FIGURE 2 and of the circuit of FIGURE 1 which are corresponding have been given the same designations. The motor armature 10 may be considered to include a resistance $R_A$ and an inductance $L_A$ which are connected at the junction 3. The motor armature 10 may also be considered to produce a voltage $V_A$ indicated by the battery having the indicated polarity. Thus the first series circuit includes the battery having the voltage $V_A$, the armature inductance $L_A$, the armature resistance $R_A$, and the first resistor 14. The second series circuit includes elements whose characteristics are intended to duplicate, either exactly or in some proportion, the characteristics of the elements of the first series circuit. Thus, the second series circuit includes the inductance 16, the second resistor 18, the third resistor 20, and the fourth adjustable resistor 22. Although it is not necessary, it is preferable that the first resistor 14 be adjusted to present a magnitude substantially equal to the magnitude of the armature resistance $R_A$. Likewise, it is preferable but not necessary that the second and third resistors 18, 20 have equal magnitudes. The fourth resistor 22 has a suitable range of magnitude which permits a net adjustment of the magnitude of resistance in the second series circuit. From a direct current standpoint, the resistance of the inductance 16 and the armature inductance $L_A$ may be neglected. In accordance with the invention, the magnitude ratio of the resistor 20 to the resistor 20 plus the resistor 18 is made equal to N, and the magnitude ratio of the resistor 14 to the resistor 14 plus the armature resistance $R_A$ is also made substantially equal to N. Thus, the folowing relationships are established:

$$\frac{V_{1-5}}{V_{1-4}} = \frac{V_{1-2}}{V_{1-3}} = N \qquad (1)$$

In these equations, V indicates voltage, the subscripts indicate the junctions between which the voltage is being expressed, and the order of the subscripts indicates the direction in which the voltage is being expressed. By circuit theory, the speed feedback signal may be expressed as follows:

$$V_{2-5} = V_{1-5} - V_{1-2} \qquad (2)$$

If Equations 1 are substituted for $V_{1-5}$ $V_{1-2}$ in Equation 2, the following is obtained:

$$V_{2-5} = N \cdot V_{1-4} - N \cdot V_{1-3} \qquad (3)$$

But in the first series circuit, the armature 10 is producing a voltage $V_A$ so that in the first series circuit, the following relationship exists:

$$V_{1-3} = V_{1-4} - V_A \qquad (4)$$

If Equation 4 is substituted in Equation 3, the following is obtained:

$$V_{2-5} = N \cdot V_{1-4} - N(V_{1-5} - V_A)$$
$$V_{2-5} = N \cdot V_A \qquad (5)$$

From Equation 5, it will be seen that a direct current signal indicative of or proportional to the armature voltage, and hence speed, can be derived from the indicating circuit of the inveniton.

In addition to a signal indicative of or proportional to the armature voltage and speed being derived from the junctions 2 and 5, the circuit of the invention enables such a signal to be relatively free of any pulses or ripple which may be present. This is attained in a manner which will be explained in connection with the vector diagrams of FIGURE 3. In FIGURE 3, it is assumed that the magnitudes of and the voltages across the resistor 14 and the armature resistance $R_A$ are equal, and that the magnitudes of and the voltages across the resistors 18, 20 are also equal. In other words, N (as defined above) is 0.5. The vectors shown in FIGURE 3 represent one of the harmonic alternating current voltages which constitute the pulses or ripple present in the two series circuits of the invention. The vectors are labeled or designated by reference numerals which correspond to the junctions whose voltages are represented by the vectors. Thus, the vector 1–4 represents the voltage between the junctions 1 and 4. It will be appreciated by persons skilled in the art that the voltages through either the first series circuit or the second series circuit must have a resultant which is the same as this vector 1–4. The voltages through the first series circuit are indicated by the vectors 1–2, 2–3, and 3–4. The vectors 1–2 and 2–3 are in the same straight line since they represent voltage drops across the resistor 14 and the armature resistance $R_A$, while the vector 3–4 forms an angle of 90 degrees relative to the other two vectors 1–2 and 2–3 since this vector 3–4 represents the voltage drop through the armature inductance $L_A$. First, assume that the vectors 1–2, 2–3, and 3–4 represent the voltage conditions in the first series circuit. Then, assume that the magnitude ratio of the resistors 20, 18 and the impedance of the inductance 16 in the second series circuit is such that the voltage across the resistors 20, 18 and the inductance 16 are respectively represented by the vectors 1–5, 5–6, and 6–4. The vectors 1–5 and 5–6 are in the same straight line since they represent voltage drops across resistors, while the vector 6–4 forms an angle of 90 degrees relative to the other two vectors 1–5 and 5–6 since this vector 6–4 represents the voltage drop through the inductance 16. If there is any alternating current voltage in the speed feedback signal derived from the junctions 2 and 5, this alternating current voltage appears as pulses or ripple. This alternating current voltage has a magnitude which is indicated by the straight line distance between the arrow ends 2 and 5 of the vectors 1–2 and 1–5. It will be seen that this magnitude may be appreciable. However, as the magnitude ratio of the resistors to the inductive impedance in the second series circuit is changed by suitable adjustment of the fourth resistor 22, the vectors or voltages may be likewise changed. And because of the 90 degree relationship between the voltages represented by the vectors 1–5 and 5–6 and the voltage represented by the vector 6–4, the arrow end 6 of the vector 5–6 always lies on the circumference of a circle having a diameter equal to the length of and passing through the ends of the vector 1–4. The vectors 1–5', 5'–6', and 6'–4 represent an increase in the magnitude ratio of the resistors to the inductive impedance, this more closely approximating the magnitude ratio in the first series circuit. In this way, the ripple between junctions 2 and 5 is reduced as will be seen by the reduced straight line distance between the arrow ends 2 and 5' of the vectors 1–2 and 1–5'. If this magnitude ratio is further increased in the same direction, a condition will be reached where the vectors 1–5, 5–6, and 6–4 coincide or are superimposed on vectors 1–2, 2–3, and 3–4 respectively. When this condition is reached, the straight line distance between the arrow ends 2 and 5 will be substantially zero, this condition representing substantially zero ripple between the junctions 2 and 5. If, after adjusting the magnitude ratio of the resistors to the inductive impedance of the second series circuit, the ripple reaches a minimum value which is not zero, this condition indicates that the magnitude ratio of the resistor 20 to the resistor 20 plus the resistor 18 is not equal to the magnitude ratio of the resistor 14 to the resistor 14 plus the armature resistance $R_A$. With reference to FIGURE 3, this means that the vectors 1–5 and 5–6 lie on the vectors 1–2 and 2–3 but they have unequal lengths so that the arrow end 5 of the vector 1–5 does not coincide with the arrow end 2 of the vector 1–2. This condition can be corrected by adjusting the first resistor 14. It might be pointed out that while the vector diagram of FIGURE 3 represents only one of the harmonic voltages present in the pulses or ripple, the same diagram applies or holds for all of the harmonic voltages present so that all such harmonic voltages which are present and which constitute the pulses or ripples are effectively cancelled or eliminated by the circuit of the invention. It will thus be seen that the circuit of the invention provides a signal which is indicative of armature voltage or speed, and which is substantially free from pulses or ripple so that the signal can be utilized in almost any manner desired. Since there is no filter network applied or used in the circuit of the invention, the circuit provides a signal which varies almost instantaneously with any change in armature speed. Thus, there is substantially no time lag between a change in armature speed and a corresponding indication of such change in the speed feedback signal.

Persons skilled in the art will appreciate that the desired magnitude and voltage ratio of the resistors to the inductive impedance of the second series circuit may be accomplished by omitting the fourth resistor 22, keeping the second and third resistors 18, 20 constant, and varying the inductance 16. The effect of such a variation by means of the inductance 16 is the same; namely, to provide means for reducing the pulses or ripple between the junctions 2 and 5. Such a circuit permits the same speed feedback signal to be derived from the junctions 2 and 5 in the same manner as explained in connection with FIGURES 1, 2, and 3.

It will be recalled that the magnitude ratio of the resistor 20 to the resistor 20 plus the resistor 18 and the magnitude ratio of the resistor 14 to the resistor 14 plus the armature resistance $R_A$ was defined as N. This ratio N may be any value desired, although certain conditions may dictate its magnitude. In one preferred embodiment of the invention which was constructed, N was made equal to 0.5 so that the magnitude of the resistor 14 was adjusted to be substantially equal to the magnitude of the armature resistance $R_A$, and the magnitude of the resistor 20 was made equal to the magnitude of the resistor 18. In this case, the speed feedback signal is one half (i.e., 0.5) of the armature voltage $V_A$. Again, however, it is to be understood that any appropriate magnitude ratio N may be used.

FIGURE 4 shows another embodiment of the indicating circuit in accordance with the invention. FIGURE 4 is similar to FIGURE 1, and corresponding parts of the two figures have been given the same reference numerals. FIGURE 4 has been simplified by the omission of the control circuit and its comparison and firing circuits 24, 26. However, FIGURE 4 can be operated with such a control circuit. FIGURE 4 includes the first series circuit and the second series circuit, the second series circuit of FIGURE 4 being modified. This modification makes the circuit of FIGURE 4 preferable for use with motors of relatively large size which requires a relatively large magnitude of current. Such large motors have an appreciable magnitude of starting current, and it may be desirable or necessary to limit such a current by the insertion of an inductance in series with the motor armature. FIGURE 4 includes such an inductance, this inductance being the upper winding 32 of an inductance 30. If such an inductance is necessary or desirable, it is relatively easy to extend this inductance by a lower winding 34 (which may be of smaller current carrying capacity) coupled to the upper winding 32 at the junction 4. The lower winding 34 of the inductance 30 thus produces an inductive voltage. A portion of this inductive voltage may be derived by a variable potentiometer 36 which is coupled across the lower winding 34. The adjustable tap of the potentiometer 36 is connected to the junction 6 of the second series circuit.

Figure 5:
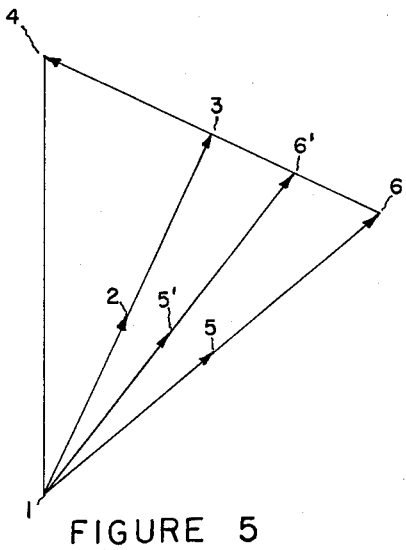
FIGURE 5 shows vector diagrams for explaining the operation of the circuit of FIGURE 4.

A speed feedback signal may be derived from the junctions 2 and 5, this speed feedback signal having a magnitude indicative of or proportional to the speed of the armature 10 as explained in connection with FIGURE 1. The reduction or elimination of pulses or ripple by the circuit of FIGURE 4 is somewhat different from that explained in connection with FIGURE 1. The vector diagrams of FIGURE 5 explain this. In FIGURE 5, it is again assumed that the magnitudes of the first resistor 14 and the armature resistance $R_A$ are equal, and that the magnitudes of the second and third resistors 18, 20 are also equal. The voltages through the first series circuit are indicated by the vectors 1–2, 2–3, and 3–4. For an initial adjustment of the potentiometer 36, the voltages through the second series circuit are indicated by the vectors 1–5, 5–6, and 6–4. For this adjustment, the pulses or ripple present between the junctions 2 and 5 are indicated by the straight line distance between the arrow ends 2 and 5 of the vectors 1–2 and 1–5. As the potentiometer 36 is adjusted, the vectors or voltages through the second series circuit may be likewise changed. The vectors 1–5', 5'–6', and 6'–4 represent an adjustment of the potentiometer 36 which reduces the voltage derived from the second winding 34, this adjustment thus reducing the ripple between junctions 2 and 5 as indicated by the reduced straight line distance between the arrow ends 2 and 5' of the vectors 1–2 and 1–5'. It will be seen that the arrow end 6 of the vector 5–6 always lies on a straight line extension of the vector 3–4. If this adjustment is continued in the same direction, a condition will be reached where the vectors 1–5, 5–6, and 6–4 coincide or are superimposed on vectors 1–2, 2–3, and 3–4 respectively. When this condition is reached, the straight line distance between the arrow ends 2 and 5 will be substantially zero, this condition representing substantially zero ripple between the junctions 2 and 5. The remarks previously made about the minimum not reaching zero are also applicable here.

The circuit of the invention provides a new and improved indicating circuit for indicating the voltage and speed of an armature of a direct current machine. This indicating circuit produces a speed feedback signal proportional to the armature voltage or speed, and may be adjusted so that substantially no pulses or ripple are present in the speed feedback signal. In addition, the circuit has no time lag or delay so that its indication is almost instantaneous. Persons skilled in the art will appreciate that uses, modifications, or embodiments of the invention come within the spirit and scope of the invention. Therefore, such uses, modifications, or embodiments may be made without departing from the spirit of the invention or from the scope of the claim.

What I claim as new and desire to secure by Letters Patent of the United States is:

A circuit for generating a ripple-free D.C. signal which bears a fixed predetermined relationship with respect to the D.C. voltage produced by the armature of a direct current machine energized from a source of rectified alternating current comprising a source of rectified alternating current, a first resistor coupled to said armature to form a first series circuit, a second resistor, a third resistor, an inductance, means coupling said second and third resistors together and to said inductance to form a second series circuit, means coupling said first and said second series circuits in parallel across said source with said first and second resistors being connected to a common point, means coupled to corresponding intermediate points of said first and said second series circuits for deriving a D.C. signal therefrom, said first resistor being variable so that it can be adjusted to assume a value with respect to the total resistance of said first series circuit which provides a ratio which is the same as the ratio which said second resistor bears to the total resistance of said second series circuit so that said D.C. signal bears a fixed predetermined relationship with respect to the D.C. voltage produced by said armature, and a second variable resistor coupled in parallel with said second and third resistors to permit the total resistance of said second series circuit to be adjusted without affecting said ratio of said second series circuit so that the ripple voltage between said intermediate points may be eliminated by adjusting said second variable resistor without affecting said fixed predetermined relationship.

References Cited by the Examiner

UNITED STATES PATENTS

| | | | |
|---|---|---|---|
| 2,289,171 | 7/1942 | Baston | 318—331 |
| 2,516,568 | 7/1950 | Haneiko | 318—331 |
| 2,689,320 | 9/1954 | Aloisio | 318—331 X |
| 2,777,106 | 1/1957 | Brown | 318—331 |
| 2,799,818 | 7/1957 | Brown | 318—331 |
| 2,799,819 | 7/1957 | Brown | 318—331 |
| 2,814,012 | 11/1957 | Swanson | 318—331 |
| 3,064,174 | 11/1962 | Dinger | 318—331 |

FOREIGN PATENTS 580,005   8/1946   Great Britain.

JOHN F. COUCH, *Primary Examiner.*

ORIS L. RADER, *Examiner.*